Feb. 5, 1963 K. BITTEL 3,076,643
OLEO SHOCK ABSORBER FOR AUTOMOTIVE VEHICLES AND THE LIKE
Filed Aug. 15, 1960 2 Sheets-Sheet 1
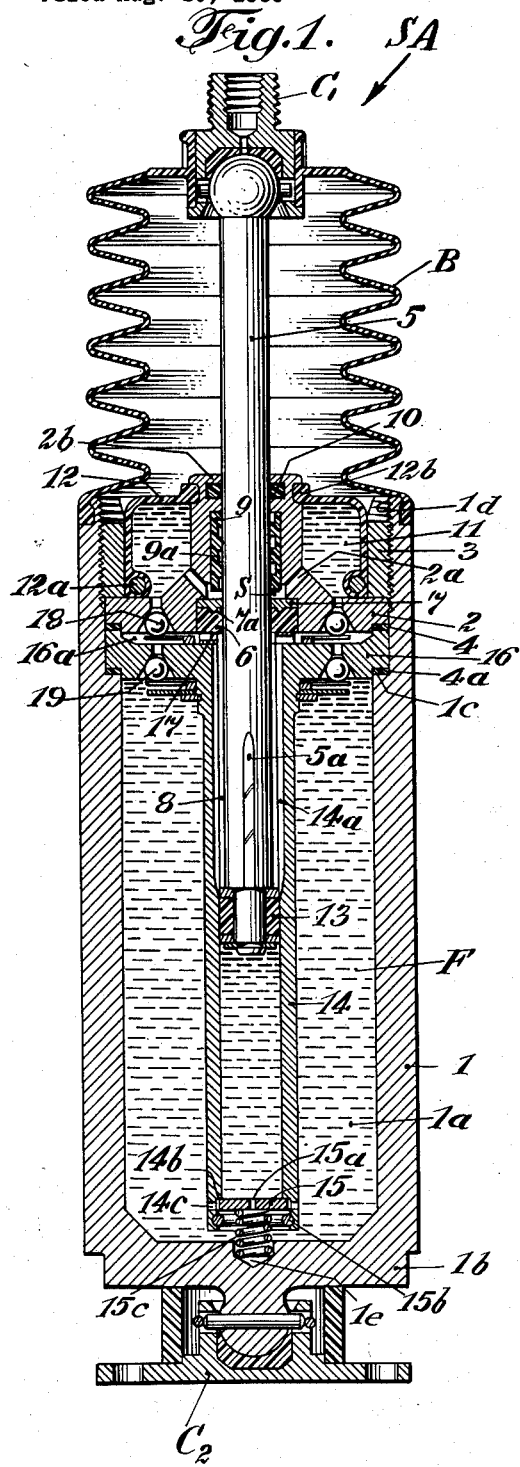
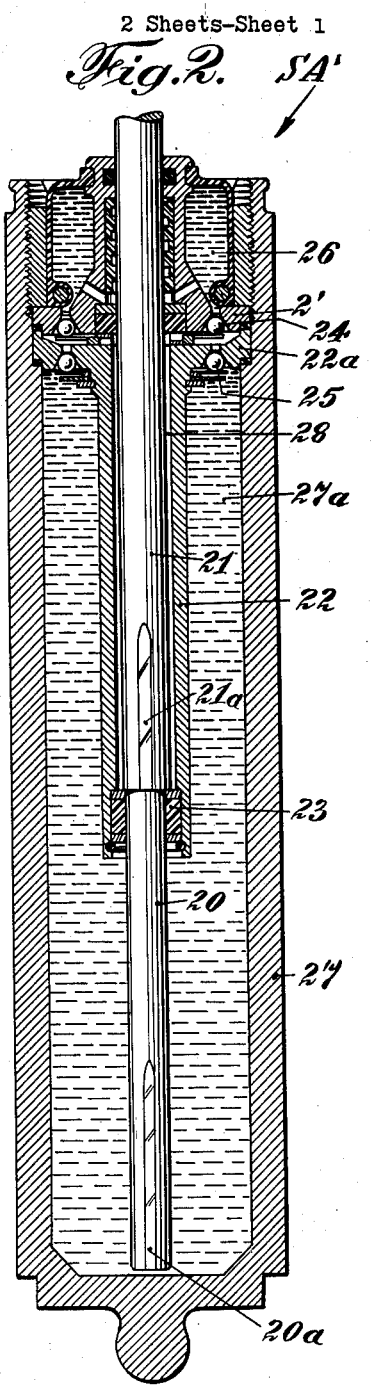
INVENTOR
*Karl Bittel*
BY
his ATTORNEY Feb. 5, 1963 K. BITTEL 3,076,643
OLEO SHOCK ABSORBER FOR AUTOMOTIVE VEHICLES AND THE LIKE
Filed Aug. 15, 1960 2 Sheets-Sheet 2
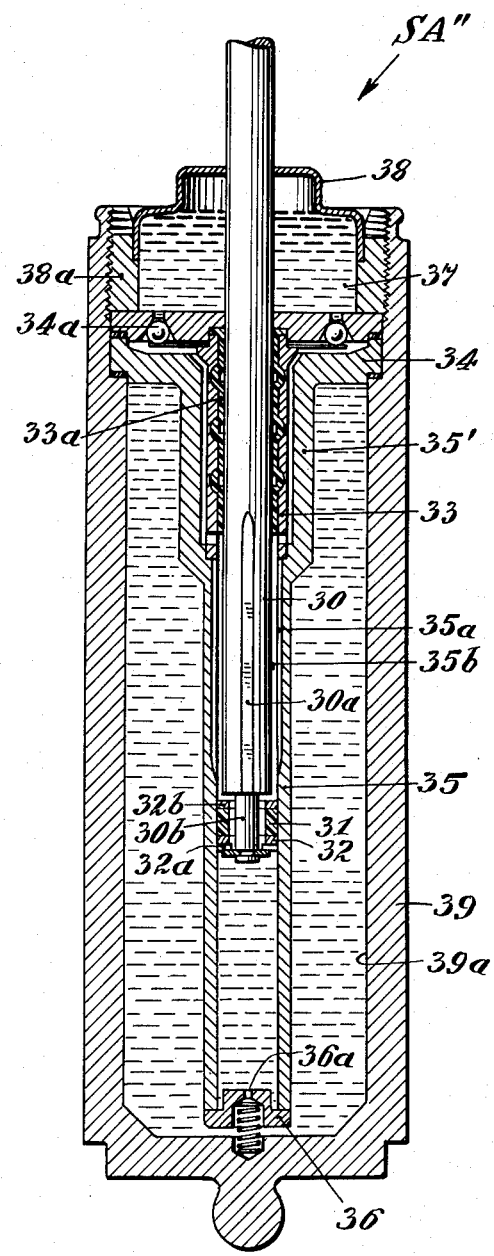
Fig.3.
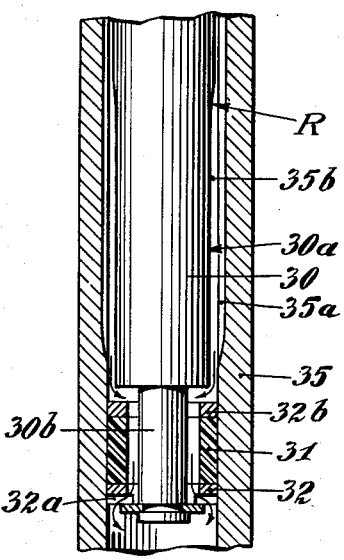
Fig.4.
Fig.5.
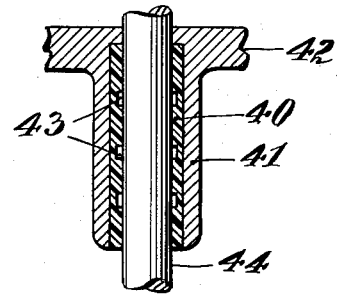
Fig.6.
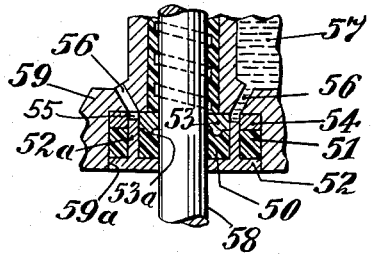
INVENTOR
Karl Bittel
BY
his ATTORNEY United States Patent Office 3,076,643
Patented Feb. 5, 1963

3,076,643
OLEO SHOCK ABSORBER FOR AUTOMOTIVE
VEHICLES AND THE LIKE
Karl Bittel, Dresden, Germany, assignor to VEB
Flugzeugwerke Dresden, Dresden, Germany
Filed Aug. 15, 1960, Ser. No. 49,612
10 Claims. (Cl. 267—64)

The present invention relates to shock absorbers in general, and more particularly to an oleo shock absorber which may be utilized as a means for resiliently mounting the frames of automotive vehicles and the like.

A fluid operated shock absorber in its simplest form comprises a plunger which is reciprocable in a fluid-filled cylinder and which carries a suitable coating of plastic or other sealing material to prevent the escape of fluid. However, since the bleeding of fluid is seldom prevented merely by the provision of a seal about the plunger, the wall of the fluid-containing cylinder usually receives a so-called recuperator piston which bears against an adjustable threaded stop. In the event of leakage, the piston is moved further into the cylinder chamber to thereby compensate for the fluid losses, whereupon the stop is readjusted to maintain the piston in its new position against the fluid pressure which prevails in the cylinder. Of course, if a shock absorber of the just described type were utilized in an automotive vehicle, the adjustments in position of the recuperator piston would have to be made by the driver himself which is extremely impractical and, therefore, such shock absorbers are useless in an automobile. In addition, the changes in fluid volume of such shock absorbers in response to temperature changes are so pronounced that the recuperator piston requires constant adjustments in addition to such adjustments which become necessary because of fluid leakage from the pressure cylinder.

An important object of the present invention is to provide an oleo shock absorber which is constructed in such a way that it can automatically compensate for losses resulting from leakage of fluid from the pressure cylinder.

Another important object of the invention is to provide a shock absorber of the above outlined characteristics which is constructed and assembled in such a way that it constantly tends to level the plunger in its neutral position.

A further object of the instant invention is to provide an oleo shock absorber for automotive vehicles and the like in which the levelling system for the plunger is fully received in the fluid containing cylinder.

A concomitant object of the invention is to provide an oleo shock absorber which embodies its own fluid reservoir from which the supply of fluid in the pressure chamber of the cylinder may be replenished in the event of leakage.

An additional object of the invention is to provide an oleo shock absorber which embodies novel sealing means for preventing, or for greatly reducing the likelihood of leakage from the fluid-containing cylinder chamber.

Still another object of the present invention is to provide a shock absorber of the above outlined characteristics which is constructed and assembled in such a way that the fluid is compressed only when the plunger is subjected to a load whereby the shock absorber may be readily installed in or removed from a conveyance and thereupon taken apart without any danger to the operator.

An additional object of the invention is to provide an oleo shock absorber of the above described type which is of very compact design, which may be manufactured in different sizes and lengths and which, once installed in a conveyance or the like, requires no further attention for long periods of time.

With the above objects in view, the invention resides in the provision of an oleo shock absorber comprising essentially a pressure cylinder having a chamber which is filled with a pressure fluid, a suction pipe which extends into and communicates with the cylinder, for example, through a damping or flow restricting valve, a plunger having a portion extending into the suction pipe and formed in its periphery with at least one axially parallel channel, a piston connected to or integral with that end of the plunger which extends into the suction pipe, and a reservoir constituting a source of pressure fluid. The plunger, its piston, and the suction pipe act as a pumping device which automatically draws fluid from, or returns fluid into the reservoir when the plunger and its piston reciprocate in the suction pipe. The diameter of the piston may be smaller than, or it may exceed the diameter of the plunger. The pumping device further comprises a system of valve means which enables the fluid to flow from the reservoir into the pressure cylinder, while the aforementioned channel or channels enable the fluid to overflow into the reservoir when the plunger recoils strongly in a direction outwardly from the suction pipe.

The pumping device draws fluid from the reservoir into the pressure chamber of the cylinder to replace fluid lost because of leakage; such additionally drawn fluid simultaneously performs a cushioning action upon the plunger when the latter is caused to reciprocate in the suction pipe. Fluid is returned into the reservoir when the plunger recoils strongly in outward direction from its neutral position whereby the slowly overflowing fluid cushions the shock absorber by tending to brake the plunger's movements from the neutral position. On the other hand, when the plunger recoils in inward direction, the pump introduces additional fluid into the pressure cylinder and thereby tends to reduce the vibration of the plunger by again braking the plunger while it moves inwardly from the neutral position.

The novel features which are considered as characteristic for the invention are set forth in particular in the appended claims. The invention itself, however, both as to its construction and its method of operation, together with additional objects and advantages thereof, will be best understood from the following detailed description of certain specific embodiments when read in connection with the accompanying drawings, in which:

FIG. 1 is an axial section through one form of the improved oleo shock absorber, showing the plunger in neutral position;

FIG. 2 is a similar axial section through a second form of the shock absorber;

FIG. 3 illustrates in axial section a third form of the shock absorber embodying the invention;

FIG. 4 is an enlarged fragmentary detail view of the plunger and piston forming part of pumping means in the shock absorber shown in FIG. 3;

FIG. 5 is an axial section through a modified packing or sealing means which is particularly suited for use in the shock absorber of FIG. 3; and FIG. 6 is an axial section through a further packing or sealing means which may be utilized in each of the three illustrated shock absorbers, but particularly in those shown in FIGS. 1 and 2.

Referring now in greater detail to the illustrated embodiments, and first to the oleo shock absorber SA of FIG. 1, there is shown an outer casing which comprises a pressure cylinder 1 and a cover or closing means 2, the latter being inserted into the open end of the cylinder 1 and retained therein by an externally threaded ring 3. This ring is screwed into the tapped bore portion 1d at the open upper end of the cylinder 1. The underside of the cover 2 rests on an annular packing 4 which, in turn, rests on the raised annular portion of an annular flange or disc 16 forming part of a suction pipe 14. This suction pipe extends downwardly toward the closed lower end or bottom 1b of the cylinder 1. A second annular packing 4a is interposed between the underside of the flange 16 and an upwardly facing annular shoulder 1c formed in the bore of the cylinder 1. It will be noted that the upper packing 4 is fully enclosed by the inner surface of the cylinder 1, by the cover 2, and by the flange 16, and that the lower packing 4a is fully enclosed by the members 1 and 16. These packings 4, 4a may be made of polyamide or other suitable synthetic plastic material and completely seal the chamber 1a in the cylinder 1, i.e. they prevent the hydraulic fluid F contained in the chamber of pressure cylinder 1 from bleeding along the periphery of the flange 16 and cover 2.

The cover 2 and its upwardly and outwardly projecting concentric extension 2b is formed with a coaxial bore for reciprocably receiving a plunger 5. A portion of the bore in the cover 2 is enlarged to receive sealing means comprising an annular packing 6 and a thrust ring 7 which is disposed above the packing 6 and abuts against a downwardly facing internal annular shoulder of the cover 2. That side of the thrust ring 7 which abuts against the annular packing 6 is formed with an annular bead 7a which prevents cold flow of the packing material in a direction upwardly and through the annular clearance formed between the members 5 and 7. The extension 2b is also formed with an enlarged coaxial bore portion which receives a guide sleeve or bush 9, the latter preferably consisting of polyamide and being provided in its inner surface with a helical groove 9a which permits the flow of lubricant about the periphery of the plunger 5. The uppermost portion of the extension 2b has an internal annular groove which receives further sealing means in the form of a resilient O-ring 10, the latter's purpose being to prevent any bleeding of fluid in upward direction into the interior of the dust excluding bellows B.

At its junction with the extension 2b, the cover 2 is provided with a number of radial ducts 2a which constitute communicating passages leading from the space formed between the ring 7 and bush 9 into an annular fluid reservoir 11, this reservoir being formed about the outer side of the extension 2b, above the cover 2, and within a rubber diaphragm 12. The diaphragm has a reinforced lower edge portion 12a which bears against the inner side of retaining ring 3, and a reinforced upper edge portion 12b which is sealingly received in an external annular groove formed in the extension 2b at the level of the sealing ring 10. The resilient diaphragm 12 is adapted to conform to changes in the volume of the reservoir 11, i.e. it will expand when the latter receives more fluid. Any fluid bleeding upwardly about the plunger 5 is collected in the space S and may flow into the reservoir 11.

The lower end portion of the plunger 5 carries a pump piston 13 which preferably assumes the form of an annulus made of polyamide or the like, and which is sealingly received for axial movement in the coaxial bore of the aforementioned suction pipe 14, the pipe 14 constituting the cylinder of the pumping device. The open lower end of the pipe 14 mounts a fluid flow restricting or damping valve comprising a disc 15 which is formed with a comparatively small coaxial orifice 15a. This valve disc is movable between a downwardly facing shoulder 14b in the pipe 14 and a stop in the form of a split ring 15b also received in the pipe 14 below the level of the shoulder 14b. The valve disc 15 is constantly biased against the shoulder 14b by a helical spring 15c whose lower end is received in a shallow blind bore 1e of the cylinder bottom 1b. Adjacent to its open lower end, the pipe 14 is provided with radial ducts 14c which permit communication of fluid between the chamber 1a and the interior of the tube 14 when the valve disc 15 is depressed against the bias of spring 15c. Otherwise, the sole means of communication between the chamber 1a and the hollow pipe 14 is provided by the coaxial orifice 15a of the valve disc 15.

The inner surface of the pipe 14 is formed with preferably two axially parallel, symmetrically arranged recesses or channels, 14a of very small depth, each recess being preferably of arcuate cross-sectional contour. Such recesses may be formed by pressing a hard spherical body against the inner side of the pipe 14 and by simultaneously rolling the spherical body in the axial direction of member 14. Each recess 14a extends substantially from the median portion to the open upper end of the pipe 14. The cover 2 contains at least one but preferably two or more one-way ball valves 18 which can permit the flow of fluid from the reservoir 11 into the compartment or space 16a formed between the parts 2 and 16. The flange 16 also contains at least one but preferably two or more one-way ball valves 19 which permit the flow of fluid only in a direction from the compartment 16a into the chamber 1a.

The shock absorbing action of the device SA shown in FIG. 1 is based on the compression of a fluid, preferably oil, under the action of the plunger 5, and on the known characteristic of oil that it reduces its volume under pressure. An important advantage of the shock absorber is in that the plunger 5 simultaneously constitutes one component of a pumping device which is completely received in the cylinder 1 and which is capable of pumping fluid from the reservoir 11 into the chamber 1a or vice versa when the shock absorber is in actual use, i.e. when the plunger 5 moves in downward or upward direction beyond its neutral position of FIG. 1. The pumping device constitutes automatic levelling means which insures that the plunger always rapidly returns into its neutral position.

The shock absorber SA operates as follows:

When the plunger 5 and its piston 13 is subjected to a heavy load such as presses these parts in downward direction toward the valve disc 15 and the bottom 1b, there develops a pressure drop in the annular space 8 which is defined by the periphery of plunger 5 and the inner surface of suction pipe 14 above the piston 13. Since the recesses 14a and the space 8 extend all the way to the upper end of the flange 16, they communicate with the compartment 16a between the members 2 and 16; therefore, the vacuum in the space 8 and compartment 16a will cause the one-way valves 18 to open and to permit the flow of pressure medium from the reservoir 11. Thus, it can be said that the downward stroke of the plunger 5 constitutes a suction stroke of the pump 5, 13, 14 insofar as the flow of fluid from the reservoir 11 is concerned. The fluid contained in the pipe 14 beneath the piston 13 bears with high pressure against the valve disc 15 and moves the same in downward direction into abutment with the stop means or split ring 15b, i.e. counter to the bias of spring 15c, whereby the fluid can flow into the chamber 1a not only through the orifice 15a but also through the radial ducts 14c of the pipe 14. Such still rather slow reduction of fluid contents in the pipe 14 beneath the piston 13, the suction above the piston, and the friction of fluid passing through the orifices 14c and 15a bring about the advantageous cushioning action of the shock absorber SA when its plunger 5 moves downwardly and beyond the median or neutral position of FIG. 1. The fluid F in the chamber 1a is then compressed and undergoes a reduction in volume.

When the plunger 5 and its piston 13 recoil in upward direction, the high fluid pressure in the chamber 1a assists the resilient means 15c in rapidly moving the valve disc 15 into sealing position of FIG. 1 whereby the small orifice 15a again constitutes the sole passage for return flow of fluid from the chamber 1a into the pipe 14.

Since the increase in volume of the space formed in the pipe 14 below the piston 13 is faster than the rate at which the fluid can return through the orifice 15a, there develops a pressure drop at the underside of the plunger 5 which tends to hinder the latter's upward movement, i.e. the cushioning action of the shock absorber SA is now felt when the plunger 5 moves in upward direction. While the piston 13 of the pumping device 5, 13, 14 moves from its lowermost position back into the position of FIG. 1, i.e. before it reaches the lower ends of axially parallel recesses 14a, it expels a corresponding quantity of fluid from the chamber 8 into the annular compartment 16a between the members 2, 16 and causes the one-way valves 19 to open and to thus permit the flow of fluid from annular space 8 and compartment 16a into the upper part of cylinder chamber 1a.

If the plunger 5 moves upwardly and well beyond its neutral position of FIG. 1, it permits return flow of fluid into the reservoir 11 in the following manner: The periphery of the plunger 5 above the pump piston 13 is formed with at least one elongated axially parallel channel 5a whose depth may be in the range of one or more tenths of a millimeter, and whose wall is ground and preferably precision finished. The length of the channel 5a is selected in such a way that, when the plunger 5 moves a predetermined distance above its neutral position of FIG. 1, it completes a passage between the interior of the pipe 14 below the piston 13 and the reservoir 11. This passage consists of the annular space 8, of the recesses 14a, of the channel 5a whose upper end is then at least slightly above the thrust ring 7, of the space S, and of the ducts 2a. It will be seen that the shock absorber SA continuously dampens vibrating movements of the plunger 5 by tending to locate the plunger in the neutral position of FIG. 1. The channel 5a permits temporary discharge of fluid back into the reservoir 11 during excessive upward and outward movements of the plunger. The length of channel 5a may be selected in such a way that it will permit return flow of fluid into the reservoir 11 when the plunger 5 moves a distance of say 1–2 cm. upwardly and beyond its neutral position. The pump piston 13 moves upwardly and beyond the lower ends of recesses 14a before the upper end of the channel 5a advances beyond the composite sealing means 6, 7. The levelling action of the pumping device forming part of the shock absorber is due to the fact that it tends to lift the plunger 5 when the latter sinks below the position of FIG. 1 by pumping additional fluid into the chamber 1a which urges the piston to rise into the position of FIG. 1, and by temporarily expelling fluid when the piston moves upwardly and well beyond its neutral position. Fluid is expelled into the reservoir 11 whenever the frame of the vehicle embodying the shock absorber SA is lifted a distance of say 1–2 cm. beyond the desired level owing to the vibratory action of the plunger 5.

The upper end of the plunger carries coupling means $C_1$ with the help of which it may be connected to a first part of a conveyance, and the lower end of cylinder 1 carries lower coupling means $C_2$ for connection to a second part of the conveyance. The strut consisting of plunger 5 and cylinder 1 dissipates energy by friction of fluid passing through the damping valve and by the compression of fluid in members 1, 14 when the plunger moves inwardly. Dissipation of energy during upward movement of the plunger 5 is due to suction at the underside of the piston 13, to friction of fluid passing through the orifice 15a, and to compression of fluid in the compartment 16a. When the plunger 5 is in its neutral position, the pressure in chamber 1a equals the pressure in the annular space 8.

The packing 6 in the cover 2 may assume a non-circular shape, preferably the shape of a square which is formed with a bore for the plunger 5. The underside of this packing rests upon a corrugated disc 17 which is inserted into the compartment 16a between the cover 2 and flange 16 and which maintains the packing 6 in position even if no pressure prevails therebelow. When the compartment 16a contains hydraulic fluid under high pressure, the fluid presses against the underside of the packing 6; owing to its elastic properties, the latter bears against the thrust ring 7 and against the periphery of the plunger 5 to thereby prevent upward flow of fluid into the space S thereabove. As before stated, the annular bead 7a at the underside of the thrust ring 7 prevents cold flow of packing 6 upwardly and about the plunger 5. The sealing means 6, 7 is mounted in a non-circular recess forming an enlarged portion of the coaxial bore in the cover 2. This recess extends upwardly from the compartment 16a.

FIG. 2 illustrates a modified oleo shock absorber SA' whose pressure cylinder 27 is of smaller diameter but longer than the cylinder 1 of FIG. 1. Only such component parts which differ from the corresponding component parts of the shock absorber SA will be fully described in FIG. 2. The diameter of the pump piston 20 is smaller than the diameter of the plunger 21. At its open lower end, the suction pipe or pump cylinder 22 contains a guide sleeve 23 of polyamide or the like, its purpose being to guide and to form a seal about the pump piston 20. The plunger 21 is provided with an axially parallel facet or channel 21a which extends downwardly and all the way to the upper end of the piston 20, and the latter is formed with a similar channel or facet 20a which extends all the way to its lower end. The length of channels 20a, 21a is substantially the same, i.e. approximately one-half the length of the member 20. The damping or flow restricting valve 15, 15a, 15b, 15c is not necessary in the shock absorber SA' because the elongated piston 26 extends well into the chamber 27a.

The pumping action of the modified shock absorber shown in FIG. 2 is due mainly to difference in the diameters of parts 20, 21. In addition, while the shock absorber SA draws oil when the piston 13 moves downwardly and beyond its neutral position, the shock absorber SA' draws oil while its plunger 21 moves in upward direction. Thus, when the plunger 21 moves upwardly and away from the guide sleeve 23, a drop in pressure develops in the annular space 28 formed between the inner surface of the suction pipe 22 and the periphery of the plunger 21 because the space 28 is now increased by the volume of progressively increasing annular chamber formed between the upwardly moving piston 20 and the inner surface of the suction pipe 22. The one-way valves 24 in the cover 2' open and permit the flow of fluid from the reservoir 26 into the annular space 28. The suction at the underside of the plunger 21 during the latter's upward movement provides the cushioning action.

When the plunger 21 returns in downward direction, it expels fluid from the space 28, through the one-way valves 25 in the flange 22a of suction pipe 22, and into the upper part of the pressure chamber 27a in the cylinder 27.

The excess fluid, or the fluid becoming superfluous when the plunger is under no axial pressure, may be discharged through the channel 21a. The channel 20a permits the flow of fluid from the chamber 27a into the space 28 when its upper end is lifted above the guide sleeve 23. In such position of the plunger 20, the channel 21a communicates with the reservoir 26 and provides a communicating passage for the flow of oil from the space 28.

In the embodiment of FIG. 2 the pump piston 20 is rigidly connected to piston 21, in fact, both elements are shown as consisting of one piece. The pressure chamber 27a is filled with fluid. Upon the extension of the pump piston 20 into the pressure chamber 27a, the pressure of fluid therein rises to about 1500 atmospheres. When the pump piston 20 moves out of the pressure chamber 27a, then the volume of the annular space 28 is increased because the pump piston 20 is of smaller diameter than piston 21. Consequently, a reduction in pressure occurs in the annular space 28 and the valves 24 open to admit fluid from the fluid reservoir 26 into the annular space 28. When the pump piston 20 moves into the pressure chamber 27a again, the fluid then flows from the annular space 28 through the valves 25 into the pressure chamber 27a.

The oleo shock absorber SA' of FIG. 3 is somewhat similar to the device SA of FIG. 1. Thus, the suction pipe or pump cylinder 35 slidably receives a pump piston 31 mounted at the lower end of the plunger 30. The piston 31 again assumes the form of a plastic sleeve which, however, has limited freedom of axial and radial movement on the reduced-diameter lower end portion 30b of the plunger 30. The metallic disc 32 at the underside of the piston 31 is formed with ducts 32a to permit the flow of oil in downward direction.

The enlarged upper end portion or head 35' of the suction pipe 35 contains a sleeve or bush 33 which not only seals but also guides the plunger 30 in the latter's axial movements. This bush 33 constitutes the main distinctive feature between the devices SA and SA'', and consists of a metallic (preferably steel) mantle which is fixed to the cover 34 and whose inner side is coated with a plastic sealing layer 33a, e.g. by an injection molding process. Above the bush 33, the plunger 30 is centered in the coaxial bore of the cover 34; its lower part is substantially centered in the bore of the suction pipe 45. The lower end of the pipe 35 carries a spring-biased damping or flow restricting valve 36 which is formed with a comparatively small orifice 36a providing a communicating passage between the chamber 39a of the cylinder 39 and the interior of the tubular member 35 below the pump piston 31. The valve 36 permits an increased flow of fluid from the suction pipe into the chamber 39a when the piston 31 is moved toward the bottom of cylinder 39.

The oil reservoir 37 above the cover 34 is sealed by a sheet-metal or like cap 38 whose downwardly extending annular flange is sealingly recessed into the body of a retaining ring 38a.

When the plunger 30 moves in downward direction beyond the neutral position of FIG. 3, subatmospheric pressure develops in the annular space 35b between the parts 30 and 35 whereby the valves 34a open and permit the flow of fluid from the reservoir 37 into the space 35b. The upward flow of fluid through the piston 31 is then prevented because the shoulder formed between the plunger 30 and its extension 30b bears against the upper metallic disc 32b to thereby seal the latter's coaxial bore. However, when the plunger 30 moves in upward direction, the valves 34a return into sealing position and the fluid flows from the space 35b about the reduced end portion 30b within the piston 31 and through the ducts 32a into the hollow suction pipe 35 beneath the member 31. The suction at the underside of the piston 31 tends to retard the upward movement of the plunger 30, i.e. it exerts a braking force which tends to dampen the vibrations. The flow of fluid from the space 35b through the piston 31 is indicated by arrows in FIG. 4. It will be noted that the upper disc 32b above the piston 31 has sufficient axial and radial play on the reduced plunger portion 30b to permit the flow of fluid into the bore of the piston 31.

The radius of curvature R (FIG. 4) at the upper end of the channel 30a indicates a smooth transition between the deepest zone of said channel and the periphery of the plunger 30. The purpose of the channel 30a and of recesses 35a is the same as that of the channel 5a in the plunger 5 and of the recesses 14a in the suction pipe 14, i.e. they can complete a passage for return flow of fluid from the chamber below the piston 31 and from the space 35b into the reservoir 37 when the upper portion of channel 30a extends beyond the cover 34 and sealing means 33, and when the piston 31 moves above the lower ends of recesses 35a, i.e. when the plunger recoils to a predetermined extent in upward direction from its neutral position.

FIG. 5 illustrates modified packing or sealing means for the plunger of my improved shock absorber. The packing consists of an elongated sleeve or bush 40 which is made of polyamide or a similar synthetic plastic material but, in contrast to the sleeve 33 of FIG. 4, does not utilize a metallic mantle. The metallic mantle is replaced by a tubular extension 41 of the cover 42. The inner surface of the sleeve 40 is formed with a number of oil collecting grooves 43 surrounding the plunger 44.

FIG. 6 illustrates a further modification of a packing or sealing means for use in the oleo shock absorber of my invention. The packing comprises two spaced concentric sealing rings 50, 51 of polyamide or the like which are separated by the upwardly extending leg 52a of a metallic lower thrust ring 52 of T-shaped cross-sectional contour. The upper end faces of the sealing rings 50, 51 are turned toward the cover 59 and bear against an inner and an outer metallic thrust ring 53, 54, respectively. The inner thrust ring 53 is formed with a downwardly extending annular bead 53a which is pressed into the upper end face of the inner sealing ring 50 and prevents the latter's cold flow into the annular clearance between the ring 53 and the plunger 58. The upwardly extending leg 52a of the thrust ring 52 does not extend all the way to the upper end faces of sealing members 50, 51 so that the annular space 55 between the members 50, 51 is free to communicate with the oil reservoir 57 through the radial ducts 56 formed in the cover 59. Thus, no pressure prevails at the uppermost end of the leg 52a and the T-shaped thrust ring 52 is free to bear against the lower end faces of sealing rings 50, 51 in order to press the same into the annular but preferably non-circular recess 59a forming an enlarged portion of the coaxial bore in the cover 59, and against the inner and outer thrust rings 53, 54 respectively.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An oleo shock absorber comprising, in combination, a strut including a cylinder and a coaxial plunger, said cylinder having a closed end and an open end; cover means sealingly received in said open end and having a bore for permitting reciprocation of said plunger inwardly toward and outwardly away from said closed end; a suction pipe in said cylinder located between said closed end and said cover means, said pipe reciprocably receiving a portion of and defining an annular space with said plunger, and having a flange sealingly fixed to said cylinder whereby said flange and said closed end define a pressure chamber in said cylinder; a piston connected for movement with said plunger and slidably received in said suction pipe for at least partially sealing said chamber from said space when the plunger assumes a neutral position in which the pressure in said chamber equals the pressure in said space; a pressure fluid filling said chamber; a fluid reservoir in said cylinder outwardly adjacent to said cover means and sealed from said space when the plunger is in said neutral position; sealing means surrounding said plunger for preventing leakage of fluid from said space; one-way valve means in said cover means for permitting the flow of fluid from said reservoir into said space in response to a pressure drop developing in said space when the plunger moves in one direction from said neutral position; and second valve means for permitting the flow of fluid from said suction pipe into chamber in response to a pressure rise developing in said space when the plunger moves in the other direction from said neutral position, said plunger having channel means defining a fluid passage between said space and said reservoir when the plunger recoils outwardly to such an extent that a portion of said channel means is moved beyond said sealing means.

2. A shock absorber according to claim 1 wherein said flange also defines with said cover means an annular compartment which communicates with said annular space, the bore of said cover means has an enlarged non-circular portion at its end communicating with said compartment, and said sealing means is mounted in the enlarged portion of the bore in said cover means and comprises a thrust ring, an annular packing adjacent to said thrust ring, and a corrugated member received in said compartment between said packing and said flange for urging the packing against said thrust ring.

3. A shock absorber according to claim 1 wherein said suction pipe comprises a boss and said flange forms part of said boss, said sealing means comprising an elongated guide sleeve fixed to said cover means and extending into the boss of said suction pipe and said sleeve comprising a metallic mantle having an inner side and a layer of plastic sealing material applied to said inner side.

4. A shock absorber according to claim 1 wherein said suction pipe comprises a boss and said flange forms part of said boss, said sealing means comprising a tubular extension connected with said cover means and projecting into said boss, and an elongated sleeve of plastic material sealingly surrounding said plunger and received in said extension.

5. An oleo shock absorber comprising, in combination, a strut including a cylinder and a coaxial plunger, said cylinder having a closed end and an open end; cover means sealingly received in said open end and having a bore for permitting reciprocation of said plunger inwardly toward and outwardly away from said closed end; a suction pipe in said cylinder located between said closed end and said cover means, said pipe reciprocably receiving a portion of and defining an annular space with said plunger, and having a flange sealingly fixed to said cylinder whereby said flange and said closed end define a pressure chamber in said cylinder; a piston connected for movement with said plunger and slidably received in said suction pipe for at least partially sealing said chamber from said space when the plunger assumes a neutral position in which the pressure in said chamber equals the pressure in said space; a pressure fluid filling said chamber; a fluid reservoir in said cylinder outwardly adjacent to said cover means and sealed from said space when the plunger is in said neutral position; sealing means mounted in the bore of said cover means for preventing leakage of fluid from said space, said sealing means comprising an inner and an outer sealing ring, said rings defining an annular space therebetween and each having a first end face turned toward and a second end face turned away from said cover means, an inner and an outer thrust ring abutting against the first end face of said inner and outer sealing ring, respectively, and a third thrust ring abutting against the second end faces of said sealing rings and having an annular leg extending into said last mentioned annular space toward but short of said first end faces, said cover means having duct means connecting said last mentioned annular space with said reservoir; one-way valve means in said cover means for permitting the flow of fluid from said reservoir into said first mentioned space in response to a pressure drop developing in said first mentioned space when the plunger moves in one direction from said neutral position; and second valve means for permitting the flow of fluid from said suction pipe into said chamber in response to a pressure rise developing in said first mentioned space when the plunger moves in the other direction from said neutral position, said plunger having channel means defining a fluid passage between said first mentioned space and said reservoir when the plunger recoils outwardly to such an extent that a portion of said channel means is moved beyond said sealing means.

6. A shock absorber according to claim 5 wherein said inner thrust ring has an annular bead extending into the first end face of said inner sealing ring for preventing the cold flow of said inner sealing ring about said plunger.

7. An oleo shock absorber comprising, in combination, a strut including a cylinder and a coaxial plunger, said cylinder having a bottom and an open end, and said plunger having an end extending into said cylinder and axially parallel channel means extending outwardly from said last mentioned end; cover means sealingly received in the open end of said cylinder and having a coaxial bore for permitting reciprocation of said plunger inwardly toward and outwardly away from said bottom; a coaxial suction pipe located between said bottom and said cover means, said pipe having an open first end adjacent to said bottom, an open second end adjacent to said cover means, an annular flange at said second end sealingly mounted in said cylinder, and axially parallel recess means extending from said second toward but short of said first end, said pipe reciprocably receiving a portion of and defining an annular space with said plunger, and said flange defining with said bottom a pressure chamber in said cylinder; a piston fixed to the end of said plunger and slidably received in said pipe to seal the same when located between said first end and said recesses; a fluid filling chamber; damping valve means mounted at the first end of said pipe constantly permitting reduced flow of fluid between said pipe and said chamber, and permitting increased flow of fluid from said pipe into said chamber when the plunger moves the piston toward said bottom; a fluid reservoir in said cylinder outwardly adjacent to said cover means; first one-way valve means in said cover means for permitting the flow of fluid from said reservoir into said space in response to a pressure drop developing in said space when the plunger moves toward said bottom; and second one-way valve means in said flange for permitting the flow of fluid from said space into said chamber in response to a pressure rise developing in said space when the plunger moves away from said bottom, said recess means and said channel means constituting a passage for fluid from said chamber into said reservoir when the plunger moves a predetermined distance outwardly and away from said bottom.

8. A shock absorber according to claim 7 further comprising a coaxial extension projecting from said cover means in a direction outwardly from said bottom and formed with substantially radial duct means, first sealing means for said plunger mounted in said extension outwardly from said duct means, and second sealing means for said plunger mounted in said cover means inwardly of said duct means, said fluid reservoir being disposed about said extension and communicating with said duct means.

9. An oleo shock absorber comprising, in combination, a strut including a cylinder and a coaxial plunger, said cylinder having a bottom and an open end, and said plunger having a reduced end portion received in said cylinder and axially parallel channel means extending outwardly from said end portion; cover means sealingly received in the open end of said cylinder and having a coaxial bore for permitting reciprocation of said plunger inwardly toward and outwardly away from said bottom; a coaxial suction pipe located between said bottom and said cover means, said pipe having an open first end adjacent to said bottom, an open second end adjacent to said cover means, an annular flange at said second end sealingly mounted in said cylinder, and axially parallel recess means extending from said second toward but short of said first end, said pipe reciprocably receiving a portion of and defining an annular space with said plunger, and said flange defining with said bottom a pressure chamber in said cylinder; a fluid filling said chamber; an annular piston slidably received in said pipe and mounted with axial and radial play on the end portion of said plunger, said piston sealing the pipe against the flow of fluid between said space and said chamber when located between said first end and said recess means and while moving toward said first end, and permitting the flow of fluid between said space and said chamber while moving in a direction away from said bottom; spring biased damping valve means mounted at the first end of said pipe, said valve means constantly permitting reduced flow of fluid between said pipe and said chamber and permitting increased flow of fluid between said pipe and said chamber when the plunger moves the piston toward said bottom; a fluid reservoir in said cylinder outwardly adjacent to said cover means; and one-way valve means in said cover means for permitting the flow of fluid from said reservoir into said space in response to a pressure drop developing in said space when the plunger moves toward said bottom, said recess means and said channel means constituting a passage for fluid from said chamber into said reservoir when the plunger moves a predetermined distance outwardly and away from said bottom to bring about a pressure rise in said space.

10. A shock absorber according to claim 9 wherein a first and second metallic disc is disposed at the opposing ends of said piston and mounted with play on said end portion, said piston and said discs sealing said pipe.

References Cited in the file of this patent
UNITED STATES PATENTS

| | | |
|---|---|---|
| 2,436,573 | Heynes | Feb. 24, 1948 |
| 2,443,615 | Gruss | June 22, 1948 |
| 2,608,404 | Gruss | Aug. 26, 1952 |
| 2,852,247 | Prescott | Sept. 16, 1958 |
| 2,861,795 | Blake | Nov. 25, 1958 |
| 2,879,057 | Heiss | Mar. 24, 1959 |
| 2,939,697 | Hogan | June 7, 1960 |
| 2,949,315 | Taylor | Aug. 16, 1960 |

FOREIGN PATENTS

| | | |
|---|---|---|
| 1,043,102 | Germany | Nov. 6, 1958 |